United States Patent Office 2,991,321
Patented July 4, 1961

2,991,321
DEHYDROGENATION IN THE PRESENCE OF OXYGEN AND BISMUTH PHOSPHATE
Hervey H. Voge, Berkeley, and Charles R. Adams, Oakland, Calif., assignors to Shell Oil Company, a corporation of Delaware
No Drawing. Filed Dec. 29, 1959, Ser. No. 862,470
9 Claims. (Cl. 260—680)

This invention relates to a new catalytic dehydrogenation process which is particularly useful for the production of butadiene and/or isoprene.

The most used commercial process for the production of butadiene and isoprene involves the catalytic dehydrogenation of n-butylene and iso-amylenes with an iron oxide catalyst promoted with sizable amounts of potassium carbonate and generally a small amount of chromium oxide. This process requires that the dehydrogenation be effected in the presence of a large excess of steam. Although the patent literature indicates steam to olefin mole ratios as low as 1 to 1, it is well known that much higher ratios are required for efficient operation. In commercial practice this ratio is above at least 8 to 1 and generally around 12 to 1.

In the hitherto used commercial process quite high reaction temperatures are required. The range used commercially generally falls between about 1090 and 1200° F. At these high temperatures and in the presence of the large amounts of steam the activity of the catalyst is maintained by the continuous removal of carbonaceous deposits from the catalyst by the steam-carbon reaction which is catalyzed by the potassium carbonate in the catalyst. Thus the potassium carbonate is an essential ingredient.

An important factor in the production of butadiene and/or isoprene by dehydrogenation is the selectivity of the dehydrogenation process. The percent selectivity is defined as 100 times the moles of desired product produced divided by the moles of feed stock destroyed or otherwise converted. In order to obtain a reasonable selectivity the prior commercial process requires the use of low pressures. Generally pressures between about 5 and 25 p.s.i.a. are used. This necessitates large equipment and complicates the recovery of the product. At these low pressures and under otherwise near optimum conditions, a selectivity around 80% may be obtained at a total conversion around 20% in the dehydrogenation of butylene to butadiene. The operations are sometimes conducted under conditions of temperature and space velocity to obtain conversions as high as about 35%, but generally somewhat lower conversions are preferred because the selectivity drops sharply as the conversion is increased. Thus, one of the major shortcomings of the hitherto used process is that the conversion must be limited to quite low values (about 25%) and this requires the working up of large amounts of material to recover the product and requires a sizeable recycle which further increases the size of the equipment.

The object of the present invention is to provide a new and improved process for the catalytic dehydrogenation of normal butylene, isoamylenes (methylbutenes), and similar higher olefins having up to 6 or 7 carbon atoms to the corresponding diolefins which process has one or more of the following advantages:

(1) The process may be carried out with no added steam while still retaining the activity of the catalyst at a high level.

(2) The process may be operated at relatively low temperatures (650–1100° F.). Whereas it is important to quicky quench the reaction product from the quite high reaction temperature to a safe temperature in the hitherto used commercial process, this is not essential in the process of the present invention where lower temperatures can be used.

(3) Potassium carbonate is not an essential ingredient in the catalyst and in fact its presence is not recommended. Consequently difficulties due to hygroscopicity of the catalyst are avoided.

(4) The process may be effected at comparatively high pressures thereby allowing small equipment to be used and facilitating the recovery of the product.

(5) The process may be operated at high conversions without sacrifice of the selectivity. This last is considered the most important of the advantages mentioned.

In general outline these objects are obtained by the process of this invention in which process a vaporized feed stream containing the olefin reactant to be dehydrogenated is passed together with certain specified amounts of oxygen and, if desired, a small amount of steam at temperatures between about 750 and 1000° F. over a bismuth phosphate catalyst and the vaporous effluent is treated in appropriate ways to recover the conjugated diolefin as the major reaction product.

The process of the present invention is principally of value at present for the dehydrogenation of normal butylenes to butadiene and/or isoamylenes to isoprene but it can also be used to dehydrogenate normal amylenes to piperylene and higher olefins, e.g., hexenes and heptenes, to the corresponding more unsaturated products. The normal butylene may be butene-1 or butene-2, either cis or trans, or a mixture of normal butylenes such, for example, as can be separated from the products obtained in the cracking of petroleum oils or by the catalytic dehydrogenation of normal butane. The isoamylene may be any one or a mixture of the methylbutenes (2-methyl-1-butene, 3-methyl-1-butene, 2-methyl-2-butene). The feed stock may contain inert diluents such as any paraffinic or naphthenic hydrocarbon having up to about 10 carbon atoms. Propylene and isobutylene should, however, not be included in any substantial amounts i.e., not more than a few percent at most.

The feed stock is preferably catalytically dehydrogenated in the presence of added steam, but it is to be emphasized that the presence of added steam is only a small benefit and is not essential. Recommended proportions of steam are between about 0.1 to 2 moles per mole of reactant, but as indicated, larger amounts can be used if desired and, and on the other hand, steam can be altogether omitted.

In the process of the present invention a certain amount of oxygen is passed with the feed stock through the reaction zone. Recommended amounts are between about 0.3 and 2.0 per mole of olefin reactant. The stoichiometric quantity to react with the hydrogen liberated is around 0.4 mole per mole of olefin depending on the extent of conversion. It is preferred to use a stoichiometric excess e.g., around 0.5 to 1 mole per mole of olefin. The oxygen may be supplied as pure or substantially pure oxygen, or air.

It is generally preferred to maintain the concentration of oxygen in the reactant mixture entering the reactor below about 12 v. percent although somewhat higher concentrations may be used if the concentration of the olefin reactant is at least about 10 v. percent when operating at 30 p.s.i.g., at least 15 v. percent when operating at 100 p.s.i.g. and at least about 20 v. percent when operating at 300 p.s.i.g. Thus, when using pure oxygen it is frequently desirable to dilute the mixture with an inert or substantially inert diluent which may be steam, $N_2$, vapors of paraffin hydrocarbons, $CO_2$, or the like. On the other hand, if the amount of oxygen is such that it would constitute more than about 12 v. percent of the reaction mixture the oxygen may be introduced in increments e.g., by injecting part of the oxygen separately into the reaction zone.

The catalyst used in the process of the invention is bismuth phosphate, nominally $BiPO_4$. It contains no potassium carbonate or the equivalent thereof and the process does not depend upon the steam-carbon reaction to maintain catalyst activity. Nevertheless continuous operation is possible. While the catalyst is bismuth phosphate the bismuth and phosphorus need not be present in the catalyst in a 1:1 atomic ratio. As the atomic ratio of bismuth to phosphorus is increased above 1:1 the activity of the catalyst declines but ratios up to about 1.4:1 can be used. On the other hand, ratios as low as 1:3 are suitable.

One convenient method for preparing a catalyst having a bismuth to phosphorus atomic ratio below 1:1 is to use an acid solution of a polyphosphate in preparing the catalyst. The acid solution of the polyphosphate may be conveniently prepared by passing a solution of an alkali metal polyphosphate e.g., sodium hexameta phosphate, through a bed of an exchange resin in its acid form.

Any suitable method may be used in preparing the catalyst. For example, a solution of a water soluble bismuth salt e.g., bismuth nitrate, may be added to a solution of the phosphate e.g., phosphoric acid, or ammonium phosphate, and the resulting precipitate filtered, washed and dried. Another suitable method is to mix dry bismuth nitrate with phosphoric acid and then dry and calcine.

The catalyst may be used with or without a filler or carrier material. If a carrier is used it is preferably one having a relatively large volume of pores of relatively large size, such, for instance, as pellets of Alundum (a bonded form of corundum), crushed fire brick, pumice, sintered or bonded silica sand aggregates, or the like. A relatively inert filler or binding agent in an amount up to about 50% by the weight of the total may be included. Suitable materials are, for example, colloidal silica, ball clay, and the like. The carrier, if used, may be impregnated with the bismuth phopshate by precipitating the bismuth phosphate in the presence of a powdered carrier or, for instance, by impregnating the carrier first with an acidic solution of bismuth acetate or an ammoniacal solution of bismuth citrate or lactate, drying and calcining in air followed by impregnating with a solution of phosphoric acid or ammonium phosphate and again drying and calcining at around 900° F. During preparation and use of the catalyst it should not be subjected to temperatures above about 1300° F. and preferably not above 1200° F.

The dehydrogenation becomes substantial at a minimun temperature around 650° F. The preferred temperatures are between about 750 and 1100° F. Higher temperatures up to about 1200° F. can be used, but only if efficient means are provided to remove the exothermic heat of reaction. The temperatures mentioned are those near the reactor inlet. If a fixed bed of catalyst is used the temperature down stream may be considerably higher, e.g. 150° F.

The preferred pressure is near atmospheric e.g., 5 to 75 p.s.i.a. On the other hand, higher pressures up to about 300 p.s.i.a. can be used and have the advantage of simplifying the product recovery.

In general the process of the present invention allows a high space velocity to be used. Thus, comparatively small reactors and catalyst inventories can be used. For example, gaseous hourly space velocities up to about 2,000 may be employed while still obtaining reasonable conversions. Gaseous hourly space velocity, abbreviated GHSV, is defined as the volumes of hydrocarbon reactant vapor calculated under standard condition (STP) passed per hours per unit volume of the catalyst bed. A wide range of space velocities may be used. Generally space velocities between about 50 and 1,000 are very satisfactory.

The contact of the feed vapors, oxygen, and steam, if any, is preferably effected by providing the catalyst in the form of a fixed foraminous bed of particles maintained at the reaction temperature and passing the feed vapors through the bed in a continuous or substantially continuous manner. In this method of operation the partial pressure of oxygen is high (maximum) at the inlet of the catalyst bed and declines towards the outlet. The concentration of diolefin product, on the other hand, is substantially zero at the inlet of the bed and maximum at the outlet. Thus, the concentration of oxygen is highest where the concentration of the desired product is lowest and the concentration of oxygen is lowest where the concentration of the desired product is highest. It is also possible to use the catalyst in power form. Thus, the powdered catalyst (e.g., passing a 100 mesh U.S. standard sieve) can be dispersed in the reactant vapor mixture and the dispersion passed through the reaction zone. Alternatively the reactant vapor mixture may be passed up through a fluidized bed of the catalyst. In this case the oxygen may be separately introduced into the catalyst bed.

The gaseous mixture issuing from the reaction zone may be quenched but this is normally not essential. Except in some cases when operating at the upper limit of the recommended temperatures there is little tendency for side reactions to take place. The effluent is preferably cooled by indirect heat exchange with the feed and then washed with dilute caustic to neutralize the traces of organic acid present and condense and remove the steam. If air is used to supply the oxygen the remaining mixture is preferably compressed and scrubbed with oil to separate the hydrocarbons from the nitrogen, carbon dioxide, and carbon monoxide. The hydrocarbon may be stripped from the oil and subjected to an extractive distillation or a copper ammonium acetate treatment in the known manner to separate and recover the diolefin.

*Example*

A catalyst was prepared by adding an approximately equal volume of approximately 0.1 molar ortho phosphoric acid to an approximately 0.09 molar solution of bismuth nitrate containing sufficient nitric acid to prevent hydrolysis. The mixture was maintained at about 113° F. and then 3 normal ammonium hydroxide was added until the mixture was approximately neutral. The bismuth phosphate which precipitated was white and grainy. This precipitate was washed and dried at 250° F. and then calcined for 3 hours at 932° F. The calcined cake was then crushed and screened to 10–20 mesh granules. The product contained the bismuth and phosphorus in approximately equal atomic ratio and was white in color.

This product was mixed with an equal volume of 10–20 mesh pyrex glass chips and placed in a reactor tube heated with an external electric furnace and was used for the dehydrogenation of 1-butene to butadiene under the following conditions:

Temperature _____ 932° F.
Pressure _____ atmospheric
GHSV* of 1-butene _____ 300

\* Based on the bed of diluted catalyst.

The feed mixture consisted of one-sixth 1-butene, one-sixth oxygen, and the remainder inert gas. Under these conditions 58 percent of the 1-butene was converted and 80 percent (molal) of that converted was found in the products as butadiene.

We claim as our invention:
1. Process for the selective dehydrogenation of a monoolefin aliphatic hydrocarbon having from 4 to 7 non-quaternary contiguous carbon atoms to produce as the major reaction product a hydrocarbon having the same number of carbon atoms but at least one more ethylenic bond which comprises passing the first said hydrocarbon in the vapor phase together with oxygen in a ratio of about 0.3 to 2.0 moles of oxygen per mole of monoolefin through a reaction zone in contact with a solid catalyst comprising bismuth phosphate as its main active constituent at a temperature between about 750 and 1100° F., a pressure between about 5 and 300 p.s.i.a., cooling the effluent from said reaction zone, separating fixed gases from a liquid hydrocarbon phase and recovering said second mentioned hydrocarbon from said hydrocarbon phase.

2. The process according to claim 1 in which the atomic ratio of bismuth to phosphorus is between about 1 to 3 and 1.4 to 1.

3. The process according to claim 1 in which the atomic ratio of bismuth to phosphorus is about 1 to 1.

4. The process according to claim 1 in which the said bismuth phosphate is a bismuth polyphosphate.

5. The process according to claim 1 wherein the catalyst is disposed as a fixed foraminous bed.

6. The process according to claim 1 in which the dehydrogenation is effected at substantially atmospheric pressure.

7. The process according to claim 1 in which the oxygen is supplied as air.

8. The process according to claim 1 in which the first said hydrocarbon is a normal butylene and the second said hydrocarbon is butadiene.

9. Process for the selective catalytic dehydrogenation of a monoolefin having from 4 to 7 nonquaternary carbon atoms to a corresponding diolefin which comprises passing the said monoolefin in the vapor phase together with an approximately equal volume of oxygen through a reaction zone in contact with a bismuth phosphate catalyst at a temperature between about 750 and 1100° F. and a pressure between about 5 and 300 p.s.i.a.

References Cited in the file of this patent

UNITED STATES PATENTS

| | | |
|---|---|---|
| 2,326,196 | Frey | Nov. 7, 1944 |
| 2,874,191 | Foreman et al. | Feb. 17, 1959 |